US006943932B2

United States Patent
Fujita et al.

(10) Patent No.: US 6,943,932 B2
(45) Date of Patent: Sep. 13, 2005

(54) WAVEGUIDE MACH-ZEHNDER OPTICAL ISOLATOR UTILIZING TRANSVERSE MAGNETO-OPTICAL PHASE SHIFT

(75) Inventors: Junichiro Fujita, Wilmington, MA (US); Miguel Levy, Chasell, MI (US); Richard M Osgood, Chappaqua, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 10/240,521

(22) PCT Filed: Apr. 20, 2001

(86) PCT No.: PCT/US01/12839

§ 371 (c)(1),
(2), (4) Date: Jun. 30, 2003

(87) PCT Pub. No.: WO01/81989

PCT Pub. Date: Nov. 1, 2001

(65) Prior Publication Data

US 2004/0047531 A1 Mar. 11, 2004

Related U.S. Application Data

(60) Provisional application No. 60/198,797, filed on Apr. 20, 2000.

(51) Int. Cl.[7] ............................................... G02F 1/09
(52) U.S. Cl. ....................... 359/283; 359/240; 359/280
(58) Field of Search ................................. 359/238–240, 359/280–84

(56) References Cited

U.S. PATENT DOCUMENTS

| 5,058,971 | A | * | 10/1991 | Schmitt et al. | 385/11 |
| 5,479,551 | A | * | 12/1995 | DiGiovanni et al. | 385/123 |
| 5,686,990 | A | * | 11/1997 | Laznicka, Jr. | 356/460 |
| 6,611,644 | B2 | * | 8/2003 | Galstian | 385/37 |

OTHER PUBLICATIONS

Fujita et al, "Waveguide optical isolator based on Mach–Zehnder interferometer", Apr. 17, 2000, vol. 76, pp. 2158–2160.*
Mizumoto et al, "In–Plane Magnetized Rare Earth Iron Garnet for a Waveguide Optical Isolator Employing Non-reciprocal Phase Shift", Nov. 1993, vol. 29, pp. 3417–3419.*

* cited by examiner

*Primary Examiner*—Jordan M. Schwartz
*Assistant Examiner*—Jessica Stultz
(74) *Attorney, Agent, or Firm*—Baker Botts LLP

(57) ABSTRACT

A device and method for optical isolation for use in optical systems is disclosed. The device provides for a waveguide optical isolator fabricated using two arms, made of optical waveguides comprising magneto-optical material, in a Mach-Zehnder interferometer configuration. The device of the present invention operates using the TM mode of a light wave and, thus, does not require phase-matching of TM and TE modes. Further, the present invention does not use polarizers to extinguish the optical feed-back.

48 Claims, 3 Drawing Sheets

|  |  | NONRECIPROCAL PHASE SHIFT | RECIPROCAL PHASE SHIFT | TOTAL |  |
|---|---|---|---|---|---|
| FORWARD | TOP ARM | 45° | 0° | 45° | CONSTRUCTIVE |
|  | BOTTOM ARM | −45° | 90° | 45° | INTERFERENCE |
| BACKWARD | TOP ARM | −45° | 0° | −45° | DESTRUCTIVE |
|  | BOTTOM ARM | 45° | 90° | 135° | INTERFERENCE |

WAVEGUIDE MACH-ZEHNDER OPTICAL ISOLATOR UTILIZING TRANSVERSE MAGNETO-OPTICAL PHASE SHIFT

This application claims the benefit of Provisional Application No. 60/198,797 filed Apr. 20, 2000.

STATEMENT REGARDING FEDERALLY SPONSORED RESEARCH

The invention described herein was funded in part by a grant from AFOSR/DARPA Program, Contract No. F49620-99-1-0038, and in part by DARPA FAME Program, Contract No. N0017398-1-G014. The United States Government may have certain rights under the invention.

FIELD OF THE INVENTION

The present invention relates generally to optical communication systems. In particular, the present invention relates to waveguide optical isolators.

BACKGROUND OF THE INVENTION

Optical isolators are essential elements in many optical systems for protecting a light source, such as a laser, from being exposed to light which is reflected back at the light source. Such reflected light, known as "optical feedback," may cause the light source to become unstable or may even damage the light source. The problem is especially difficult in optical systems employing lasers that emit a relatively high output beam power where even surfaces of transmissive optical elements, or relatively small discontinuities or mismatches in optical waveguides can produce sufficient reflections to give rise to deleterious optical feedback.

It is known to incorporate an optical isolator in the path of the laser output beam, near the laser cavity exit aperture, to isolate the laser from reflected laser light and thereby avoid or reduce optical feedback. An optical isolator permits the forward transmission of a radiation beam, in this case the laser output beam, while simultaneously preventing the reverse transmission of the same radiation beam, with a high degree of extinction. Thus, the laser energy reflected back towards the laser from various sources of reflection is trapped, extinguished or reflected by the optical isolator.

Optical isolators based on the Faraday polarization rotation effect are available for use in laser systems. Such a conventional optical isolator is illustrated in FIG. 1. The conventional optical isolator 50 includes, a first polarizer 58 for linearly polarizing a light wave in a first direction 62 and a second polarizer 60 for linearly polarizing a light wave in a second direction 64, a longitudinal magnet 52 surrounding a magneto-optical medium 54, which may be in the form of an optical waveguide, for example. The magnet 52 applies a longitudinal magnetic field 56 to the magneto-optical medium 54.

In operation, an incident light wave is polarized by first polarizer 58 in a first direction 62. If the incident light wave is plane polarized, the first direction 62 of polarization should coincide with the polarization of the incident light wave as it leaves the light source. This polarized light wave then enters the magneto-optical medium 54, where a permanent magnet 52, or alternatively an electromagnet, applies a magnetic field 56 that causes a rotation of the plane of polarization of the light wave by 45 degrees, as shown by directional arrows 70, to align the direction of polarization of the light wave with the second polarizer 60 having a direction 64 of polarization set at 45 degrees from that of the first linear polarizer 58. In this way, a forward propagating light wave passes through the conventional optical isolator 50 with little attenuation.

A light wave of unknown polarization 74 propagating in the backward direction is first linearly polarized by the second polarizer 60. Since the polarization of light waves traveling in the backward direction is unknown, only light waves traveling in the backward direction with the polarization direction 64 of the second polarizer 60 will pass second polarizer 60 and enter the magneto-optical medium 54. Once propagating in the magneto-optical material 54, the polarization of the backward propagating light wave is rotated by 45 degrees, as shown by directional arrows 72, in the same sense as the rotation of the forward propagating light wave, causing the direction of polarization of the backward propagating light wave exiting the magneto-optical medium 54 to be polarized at 90 degrees with respect to the direction of the first polarizer 58. Therefore, the backward propagated light wave will not pass the first polarizer 58.

With such a conventional optical isolator 50, however, there has been the problem of the need for a bulky magnet for applying a longitudinal magnetic field, stringent modal phase-matching for the TM and TE modes of light waves propagating in the magneto-optical medium and addition of auxiliary components such as polarizers 58, 60. Further, non-uniformities in the longitudinal magnetic field introduce non-uniform polarization rotation across a light wave passing through the magneto-optical medium 54. Unless the light wave dimension is made equal to or smaller than the cross-section of uniform Faraday rotation, these non-uniformities limit the extinction ratio obtainable by the conventional optical isolator.

There exists a need for an optical isolator which eliminates the need for a bulky magnet for applying a longitudinal magnetic field, modal phase-matching and the need for polarizers.

SUMMARY OF THE INVENTION

In accordance with the present invention, there is provided a waveguide optical isolator having first and second optical waveguide arms formed at least in part with a material that exhibits a transverse magneto-optic non-reciprocal phase shift effect, the two optical waveguide arms being arranged in a Mach-Zehnder interferometer configuration. Transverse magnetic fields of equal magnitude are respectively applied to the two magnetically active optical waveguide arms of the Mach-Zehnder interferometer in opposite transverse directions to cause non-reciprocal phase shifts of equal magnitude but of opposite signs for light waves propagating in the two magnetically active optical waveguide arms. Further, by adjusting the path lengths of the two optical waveguide arms, a 90 degree reciprocal phase shift of a light wave propagating in the first optical waveguide arm with respect to a light wave propagating in the second optical waveguide arm of the device is achieved. During forward propagation of a light wave in the first magnetically active optical waveguide arm, the 90 degree reciprocal phase shift is combined with a −45 degree forward propagation non-reciprocal phase shift so as to provide a net phase shift of +45 degrees for the light wave after propagation through the first magnetically active optical waveguide arm. Forward propagation of a light wave through the second magnetically active optical waveguide arm results in a +45 degree forward propagation non-reciprocal phase shift. Accordingly, when light waves that were initially in phase have propagated in the forward direction through the first and second magnetically active optical waveguide arms are combined, the two light waves which are remain in phase interfere constructively. For backward propagation of a light wave through the first magnetically active optical waveguide arm, the light wave undergoes a 90 degree reciprocal phase shift combined with a +45 degree backward propagation non-reciprocal phase shift to cause a net phase shift of 135 degrees of the light wave after propagating through the first magnetically active optical waveguide arm. A light wave after propagating through the second magnetically active optical waveguide arm is phase shifted by −45 degree backward propagation non-reciprocal phase shift. Accordingly, when two light waves, which were initially in phase propagating through the first and second magnetically active optical waveguide arms, respectively, are combined, they are 180 degrees out of phase and interfere destructively. In this manner, a light wave propagating in the forward direction through the waveguide optical isolator of the present invention, which is approximately equally divided for propagation in the first and second optical waveguide arms and then recombined, will pass through the device with relatively low attenuation, while a light wave propagating in the reverse direction in the waveguide optical isolator, which is approximately equally divided for propagation in the first and second optical waveguide arms and then recombined, is extinguished by destructive interference in the Mach-Zehnder interferometer.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein.

DETAILED DESCRIPTION OF THE INVENTION

Figure 1:
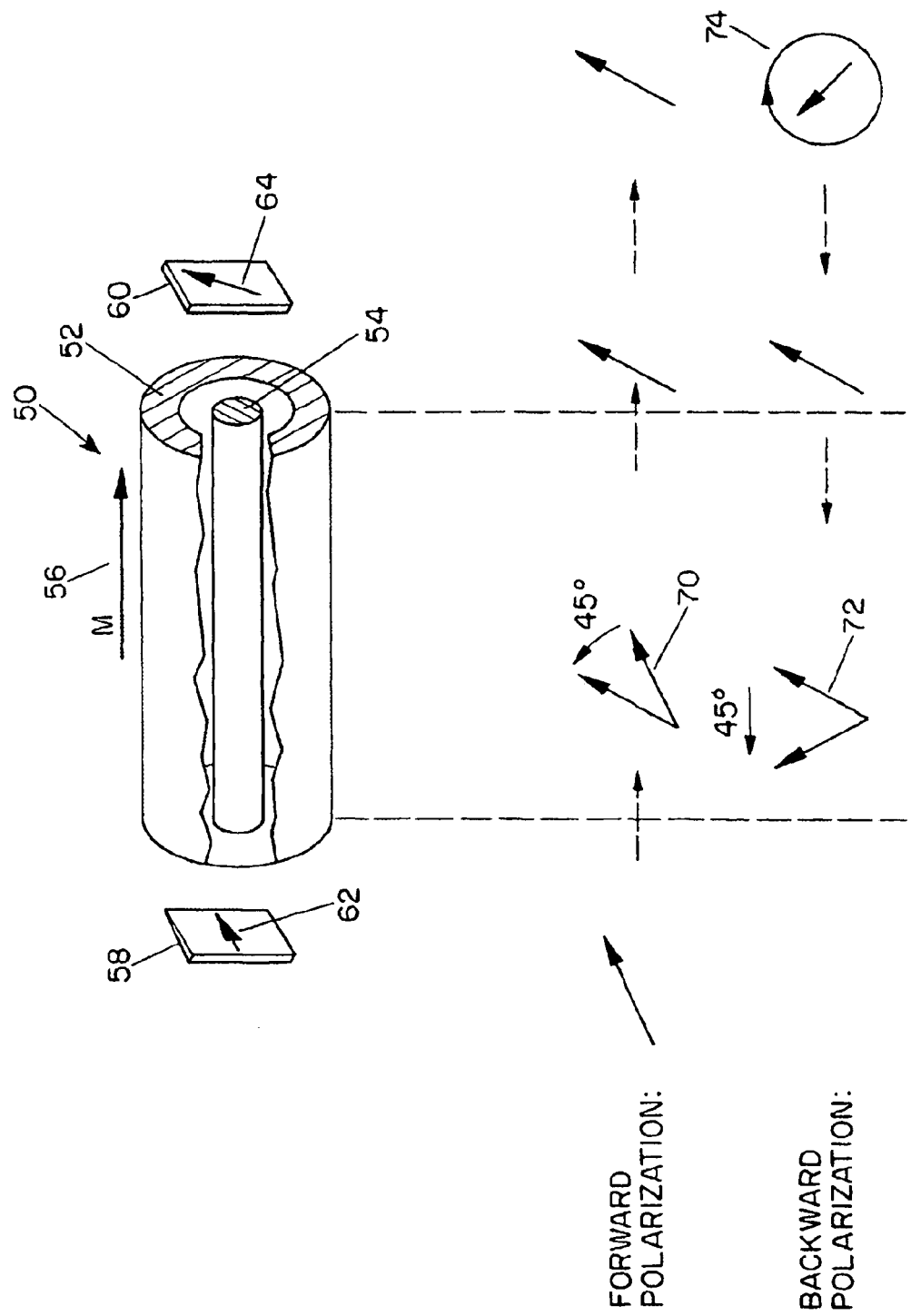
FIG. 1 is an illustration of a conventional optical isolator based on the Faraday polarization rotation effect.
Figure 2:
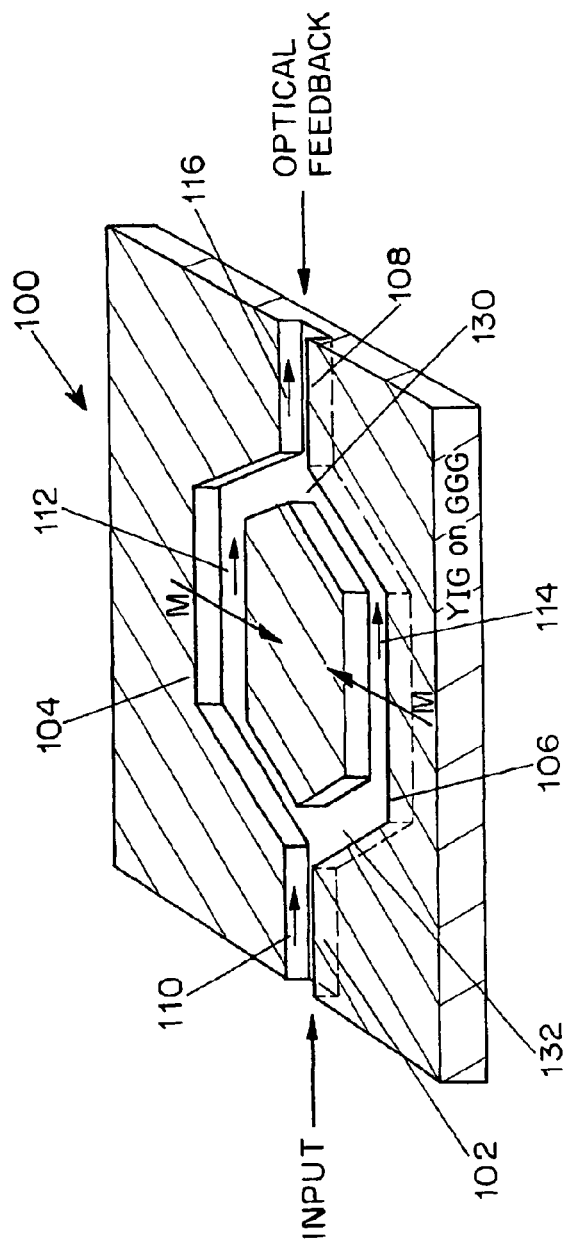
FIG. 2 is an illustration of a waveguide optical isolator fabricated in a Mach-Zehnder interferometer configuration in accordance an exemplary embodiment of the present invention.

Now referring to the drawing, FIG. 2 illustrates a waveguide optical isolator 100 fabricated in a Mach-Zehnder interferometer configuration in accordance with an exemplary embodiment of the present invention. The waveguide optical isolator 100 includes an input optical waveguide section 102, an input optical waveguide Y-branch 132, two optical waveguide arms 104, 106, an output optical waveguide Y-branch 130 and an output optical waveguide section 108. The input optical waveguide Y-branch 132 approximately equally divides a light wave (110) propagating in the forward direction in the input optical waveguide section 102 into two divided light waves and provides a respective one of the two divided light waves to each of the optical waveguide arms 104, 106 without changing the mode of propagation. The input optical waveguide Y-branch 132 also combines respective light waves propagating in the backward direction in the two optical waveguide arms 104, 106 and provides the combined light wave (116) to the input waveguide section 102 without changing the mode of propagation. The output optical waveguide Y-branch 130 combines respective light waves propagating in the forward direction and provides the combined light wave to the output optical waveguide section 108 without changing the mode of propagation. The output optical waveguide Y-branch 130 also approximately equally divides a light wave propagating in the backward direction in the output optical waveguide section 108 into two divided light waves and provides each of the two divided light waves to respective ones of the two optical waveguide arms 104, 106 without changing the mode of propagation.

Figure 3:
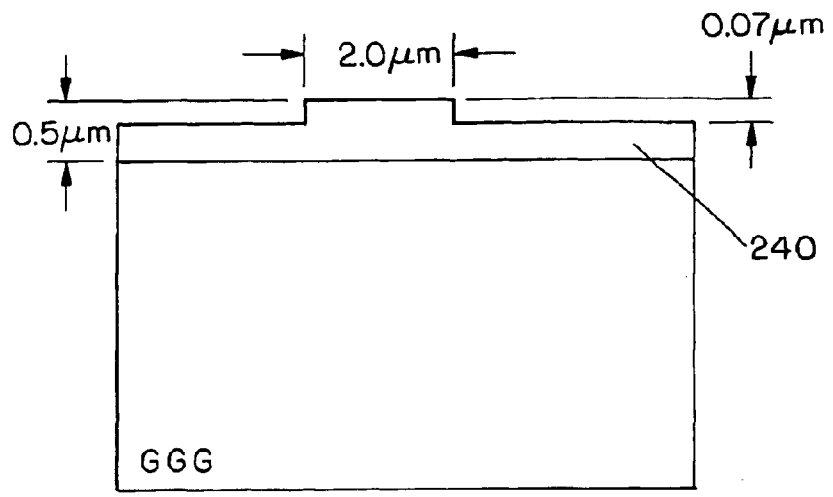
FIG. 3 is an illustration of the structure of a magnetically active optical waveguide in accordance with an exemplary embodiment of the present invention.

Referring to FIG. 3, in an exemplary embodiment, the waveguide is fabricated by growing a bismuth-, lutetium-, neodymium-iron garnet film 240 $(Bi,Lu,Nd)_3(Fe,Al)_4O_{12}$ by liquid phase epitaxy on a [111] oriented gallium gadolinium garnet (GGG) substrate. The bismuth-, lutetium-, neodymium-iron garnet film 240 is a magnetically active material which can cause non-reciprocal, controllable phase shift of a light wave propagating through it based upon a transverse magnetic field applied thereto. Alternatively, this film 240 could be bismuth-, lutetium-iron garnet or yttrium iron garnet (YIG), rare-earth substituted yttrium-iron garnet or rare-earth substituted iron garnet. Using a bismuth-, lutetium-, neodymium-iron garnet film 240, the film-substrate lattice mismatch is 0.001 nm, causing minimum stress-induced anisotropy. The film 240 has in-plane magnetization, and a refractive index of 2.2403 for the TM mode at $\lambda=1.55\,\mu m$. The film 240 initially has a thickness of approximately 1.65 $\mu m$.

Before the rib waveguides are patterned, the films 240 are thinned to optimize the non-reciprocal response to a thickness ranging from 0.3 $\mu m$ to 1.0 $\mu m$; in an exemplary embodiment this optimum thickness is approximately 0.5 $\mu m$. Since thickness tuning improves the phase shift per length, proper tuning yields a shorter device and hence reduces the total absorption loss in the waveguide optical isolator 100. Straight ridge waveguides are then patterned on the film 240 by conventional photolithographic and etching techniques. As illustrated in FIG. 3, the ridge waveguides have a width ranging from 0.5 $\mu m$ to 6.0 $\mu m$, in an exemplary embodiment this optimum width is approximately 2.0 $\mu m$; a 0.5 $\mu m$ waveguide height; and a 0.07 $\mu m$ rib height and are fabricated by photoresist patterning and phosphoric-acid wet etching. In this exemplary embodiment the etch rate is 0.01 $\mu m/min$ at 57 degrees Celsius.

A waveguide optical isolator 100 is then patterned onto a single chip by a photolithographic direct laser writing system. The resist patterns are made by focusing an Argon (Ar) laser beam ($\lambda=360$ nm) directly onto a photoresist-coated sample with computer-controlled XYZ translation stages and shutter. In an exemplary embodiment the total length of the fabricated waveguide optical isolator 100 is 8.0 mm, which includes 3.3 mm long optical waveguide arms, 0.4 mm long output and input waveguide Y-branches 130, 132, and 3.9 mm long input and output waveguide sections 102, 108. The separation between the optical waveguide arms 104, 106 is 24.4 $\mu m$, where the output and input waveguide Y-branches 130, 132 are each formed at a non critical angular separation of the branches ranging from 0.1 to 3 degrees.

The reciprocal phase shift is obtained by forming the optical waveguide arms 104, 106 with a difference in length, herein referred to as "path length." The path length has a direct impact on the reciprocal phase shift of each light wave 112, 114 after propagating through respective optical waveguide arms 104, 106. In this exemplary embodiment the top optical waveguide arm 104 has a shorter path length than the bottom optical waveguide arm 106. The path lengths are selected such that a light wave 114, originating from the input waveguide Y-branch 132 propagates in a forward direction through the bottom optical waveguide arm 106 to reach output waveguide Y-branch 130 with a phase difference of +90 degrees with respect to a light wave 112 also originating from input waveguide Y-branch 132 propagating in a forward direction through the top optical waveguide arm 104 and reaching output waveguide Y-branch 130. Further, a light wave 114, originating from the output waveguide Y-branch 130 propagates in a backward direction through the bottom optical waveguide arm 106 to reach the input waveguide Y-branch 132 having a phase difference of 90 degrees with respect to a light wave 112 also originating from the output waveguide Y-branch 130 and propagating in the backward direction through the top optical waveguide arm 104 to reach the input waveguide Y-branch 132. This reciprocal phase shift is the result of the different path lengths of the two optical waveguide arms 104, 106. In the exemplary embodiment of the present invention described above with reference to FIG. 3, the top optical waveguide arm 104 is a quarter wavelength ±30%, which is 0.2 $\mu$m, shorter than the bottom optical waveguide arm 106 in order to achieve the reciprocal phase shifts described above. This 0.2 $\mu$m total path length difference produces less than 0.006 degrees of additional non-reciprocal phase shift, and thus the unequal optical waveguide arm lengths do not otherwise affect the operation of the device.

As described above the waveguides contain magneto-optical material in the waveguides of the optical waveguide arms 104, 106, which provide non-reciprocal phase shifts when a transverse magnetic field is applied to each optical waveguide arm 104, 106. The amount of non-reciprocal phase shift depends upon the path lengths of each optical waveguide arm 104, 106, and the magnitude and direction of the transverse magnetic field applied thereto. As described above, in this exemplary embodiment the top optical waveguide arm 104 is 3.3 mm minus 0.2 $\mu$m and the bottom optical waveguide arm 106 is 3.3 mm. As shown in FIG. 2, each of the top and bottom magnetically active optical waveguide arms 104, 106 have a respective transverse magnetic fields applied thereto. The respective transverse magnetic fields are of the same magnitude but are opposite in direction. The magnitude and transverse direction of the magnetic fields are arranged so as to produce a non-reciprocal 45 degree phase shift of a light wave propagating through the top optical waveguide arm 104 in a forward direction, a non-reciprocal −45 degree phase shift of a light wave propagating through the bottom optical waveguide arm 106 in a forward direction, a non-reciprocal −45 degree phase shift of a light wave propagating through the top optical waveguide arm 104 in a backward direction, and a non-reciprocal 45 degree phase shift of a light wave propagating through the bottom optical waveguide arm 106 in a backward direction. Thus, as illustrated on FIG. 2, the end result is constructive interference at the output waveguide Y-branch 130 of light waves propagated in the forward direction in the top and bottom optical waveguide arms 104, 106, and +180 out of phase destructive interference at the input waveguide Y-branch 132 of light waves propagated in the backward direction in the top and bottom optical waveguide arms 104, 106. This allows a forward propagating light wave to pass through the optical isolator 100 while extinguishing a backward propagating light wave.

Figure 4:
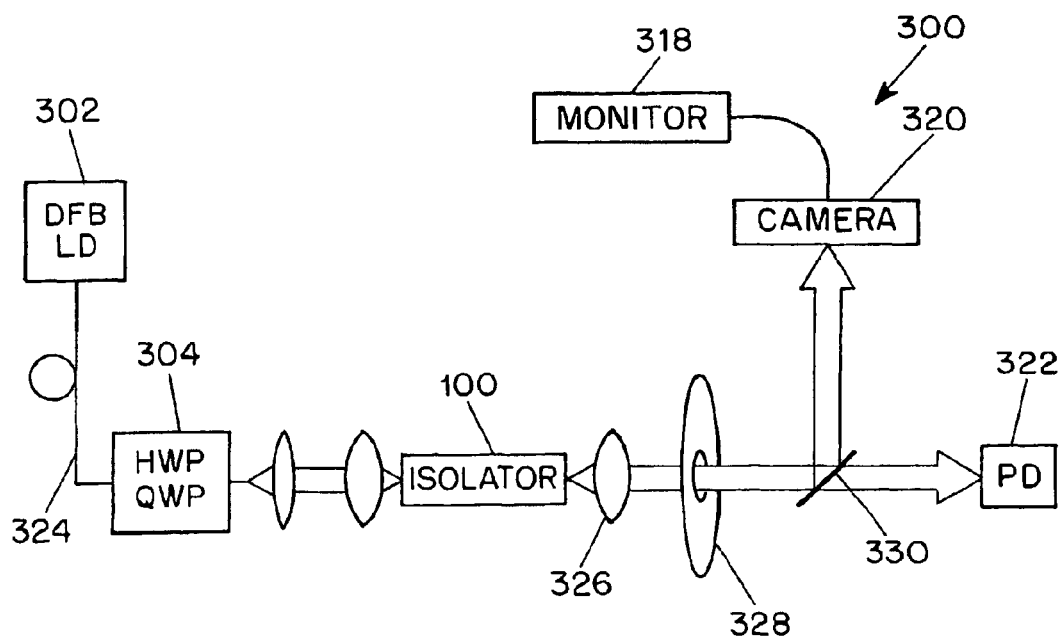
FIG. 4 is an illustration of a test apparatus for testing waveguide optical isolators fabricated in the Mach-Zehnder interferometer configuration of FIG. 2 in accordance with an exemplary embodiment of the present invention.

FIG. 4 illustrates a waveguide optical isolator testing apparatus to test a sample waveguide optical isolator 100 of the present invention. Testing apparatus 300 includes a laser source 302, e.g. laser diode, an optical fiber half-wave plate and an optical filer quarter-wave plate 304, optical isolator 100, an optional beam splitter 330, a camera 320, monitor 318, and a photodetector 322.

The waveguide optical isolator 100 is tested using testing apparatus 300 by end fire coupling a light wave from the laser source 302 to an optic fiber 324, connected to an optical fiber half-wave plate and an optical fiber quarter-wave plate 304, focusing the light from the optical fiber half-wave plate and quarter-wave plate so as to cause the propagation of TM mode light waves in the ridge waveguides of the optical waveguide isolator 100, and monitoring the light wave from the output waveguide section 108 with a silicon photodiode 322, a camera 320 and monitor 318. An output spatial filtering comprises a lens 326 and an aperture 328 is used to couple light only from the waveguide optical isolator 100 and, therefore, to eliminate any extraneous light before photodetection.

Isolation measurements are made after applying opposing magnetic fields to the optical waveguide arms 104, 106, of the waveguide optical isolator 100, thus yielding an opposite sense of non-reciprocal phase retardation shift between optical waveguide arms 104, 106 in accordance with the non-reciprocal phase shift requirements described above. This is done by placing electromagnets on opposite sides of the waveguide optical isolator 100 with a separation of 6 mm. The electromagnets are mounted on XYZ translation stages for fine spatial adjustment of the magnetic field as applied to the first and second magnetically active optical waveguide arms 104, 106. Further, the backward propagation for a light wave is simulated by reversing the polarities for both electromagnets, and the ratio in output light intensities for the two polarities of magnetic fields is taken as the isolation ratio.

Measured extinction ratios of 19 dB with 2 dB excess loss at a wavelength of $\lambda 1.54$ $\mu$m were obtained, where excess loss is defined as any loss other than material absorption, input mode coupling and waveguide Y-branch loss. In addition, the above extinction ratio and excess losses have been observed for wavelengths ranging from $\lambda=1.4$ $\mu$m to $\lambda=1.7$ $\mu$m.

The present invention provides for a waveguide optical isolator fabricated using two arms, made of optical waveguides comprising magneto-optical material, in a Mach-Zehnder interferometer configuration. Because the waveguides of the device operate in the TM mode of propagation, there is no need to phase match TM and TE modes. It is noted that operation of the waveguides in the TE mode, is also possible by introducing horizontal asymmetries in the ridge waveguides. Furthermore, other optical waveguide configurations may be used instead of the ridge waveguide.

Although the present invention has been described in detail with reference to specific exemplary embodiments thereof, various modifications, alterations and adaptations may be made by those skilled in the art without departing from the spirit and scope of the invention. In particular, the above described invention can be implemented with materials that exhibit the transverse magneto-optic non-reciprocal phase shift effect other than BiLuNe—IG or YIG.

It is intended that the invention be limited only by the appended claims.

What is claimed is:

1. A waveguide optical isolator for providing low attenuation for a light propagating in a forward direction and high attenuation for a light propagating in a backward direction, said optical system comprising:

an input optical waveguide section;

a first and second optical waveguide arms coupled to said input optical waveguide section for each receiving approximately an equal portion of an input light wave propagating in a forward direction and respectively propagating each approximately equal portion as first and second light waves in the forward direction in said first and second optical waveguide arms, and for providing to said input optical waveguide section a combined first and a second light wave propagating in a backward direction from said first and second optical waveguide arms, respectively, said first and second optical waveguide arms being fabricated at least in part with a material that provides a transverse magneto-optical non-reciprocal phase shift, said first optical waveguide arm being longer than the second optical waveguide arm by a length that results in a 90 degree reciprocal phase difference of said first light wave propagating through said first optical waveguide arm relative to said second light wave propagating through said second optical waveguide arm;

first and second magnets applying respective transverse magnetic fields to said first and second optical waveguide arms, said transverse magnetic fields, being of the same magnitude but of opposite polarity so as to cause a non-reciprocal +45 degree phase shift for said first light wave propagating in the forward direction in said first optical waveguide arm and a −45 degree non-reciprocal phase shift for said second light wave propagating in the forward direction in said second optical waveguide arm, said magnetic fields causing a non-reciprocal −45 degree phase shift for said first light wave propagating in the backward direction in said first optical waveguide arm and a +45 degree non-reciprocal phase shift for said second light wave propagating in the backward direction in said second optical waveguide arm; and an output optical waveguide section coupled to said first and second optical waveguide arms for receiving in combination said first and second light wave propagating in a forward direction from said first and second optical waveguide arms, and for providing approximately an equal portion of a feedback light wave propagating in the backward direction in the output optical waveguide section to each of said first and second optical waveguide arms for respectively propagating therein as said first and second light waves.

2. The waveguide optical isolator of claim 1, wherein said input optical waveguide section is coupled to said first and second optical waveguide arms through a first optical waveguide Y-branch having a first branch coupled to the input optical waveguide section and second and third branches coupled to the first and second optical waveguide arms, respectively.

3. The waveguide optical isolator of claim 2, wherein the second and third branches of the first optical waveguide Y-branch have an angular separation in the range of 0.1 to 3 degrees.

4. The waveguide optical isolator of claim 1, wherein said output optical waveguide section is coupled to said first and second optical waveguide arms through an optical waveguide Y-branch having a first branch coupled to the output optical waveguide section, and second and third branches coupled to the first and second optical waveguide arms, respectively.

5. The waveguide optical isolator of claim 4, wherein the second and third branches of the optical waveguide Y-branch have an angular separation in the range of 0.1 to 3 degrees.

6. The waveguide optical isolator of claim 1, wherein said material providing said transverse magneto-optical non-reciprocal phase shift is bismuth-, lutetium-, neodymium-iron garnet.

7. The waveguide optical isolator of claim 1, wherein said material providing said transverse magneto-optical non-reciprocal phase shift is bismuth-, lutetium- iron garnet.

8. The waveguide optical isolator of claim 1, wherein said material providing said transverse magneto-optical non-reciprocal phase shift is yttrium- iron garnet.

9. The waveguide optical isolator of claim 1, wherein said material providing said transverse magneto-optical non-reciprocal phase shift is rare-earth substituted yttrium- iron garnet.

10. The waveguide optical isolator of claim 1, wherein said material providing said transverse magneto-optical non-reciprocal phase shift is rare-earth substituted iron garnet.

11. The waveguide optical isolator of claim 6, wherein said material providing said transverse magneto-optical non-reciprocal phase shift is in the range of 0.3 $\mu$m to 1.0 $\mu$m thick.

12. The waveguide optical isolator of claim 1, wherein said first and second magnets are permanent magnets, said first magnet applying a transverse magnet field to said first optical waveguide arm in a first transverse direction and said second magnet applying a transverse magnet field to said second optical waveguide arm in a second transverse direction.

13. The waveguide optical isolator of claim 1, wherein said first and second magnets are electro-magnets, said first magnet applying a transverse magnet field to said first optical waveguide arm in a first transverse direction and said second magnet applying a transverse magnet field to said second optical waveguide arm in a second transverse direction.

14. The waveguide optical isolator of claim 6, wherein said input optical waveguide section, first and second optical waveguide arms and said output optical waveguide section are rib waveguides having a width ranging from 0.5 $\mu$m to 6.0 $\mu$m.

15. The waveguide optical isolator of claim 6, wherein said input optical waveguide section, first and second optical waveguide arms and said output optical waveguide section are rib waveguides having a waveguide height of 0.5 $\mu$m.

16. The waveguide optical isolator of claim 6, wherein said input optical waveguide section, first and second optical waveguide arms and said output optical waveguide section are rib waveguides having a rib height of 0.07 $\mu$m.

17. The waveguide optical isolator of claim 6, wherein said input optical waveguide section is 3.9 mm long.

18. The waveguide optical isolator of claim 6, wherein said output waveguide section is 3.9 mm long.

19. The waveguide optical isolator of claim 2, wherein said first optical waveguide Y-branch is 0.4 mm long.

20. The waveguide optical isolator of claim 4, wherein said optical waveguide Y-branch is 0.4 mm long.

21. The waveguide optical isolator of claim 1, wherein said first optical waveguide arm is spaced 24.4 $\mu$m from said second optical waveguide arm.

22. The waveguide optical isolator of claim 1, wherein said first magnet is spaced 6 mm from said second magnet.

23. The waveguide optical isolator of claim 6, wherein said first and second light waves each have a wavelength in vacuum of 1.55 μm and said first optical waveguide arm is 0.2 μm shorter than said second optical waveguide arm.

24. The waveguide optical isolator of claim 6, wherein said first optical waveguide arm is approximately a quarter wavelength of said first and second light waves in said first and second optical waveguide arms shorter than said second optical waveguide arm.

25. The waveguide optical isolator of claim 6, wherein said waveguide optical isolator is operable in the wavelength range from 1.4 μm to 1.7 μm.

26. A method of isolating a light source from optical feedback comprising:
providing an input light wave from said light source to an input optical waveguide section;
providing said input light wave from said input optical waveguide section to a first and second optical waveguide arms coupled to said input optical waveguide section, said input optical waveguide section being coupled to provide approximately an equal portion of said input light wave propagating in a forward direction to each of said first and second optical waveguide arms for respective propagation therein as a first and second light wave in a forward direction and to provide said input optical waveguide section a combined first and second light wave propagating in a backward direction from said first and second optical waveguide arms, respectively, said first and second optical waveguide arms being fabricated at least in part with a material that provides a transverse magneto-optical non-reciprocal phase shift, said first optical waveguide arm being longer than said second optical waveguide arm by a length that results in a 90 degree reciprocal phase difference of said first light wave propagating through said first optical waveguide arm relative to said second light wave propagating through said second optical waveguide arm;
applying first and second transverse magnetic fields to said first and second optical waveguide arms, respectively, so as to cause a non-reciprocal +45 degree phase shift for said first light wave propagating in the forward direction in said first optical waveguide arm and a −45 degree non-reciprocal phase shift for said second light wave propagating in the forward direction in said second optical waveguide arm, said magnetic fields causing non-reciprocal −45 degree phase shift for said first light wave propagating in the backward direction in said first optical waveguide arm and a +45 degree non-reciprocal phase shift for said second light wave propagating in the backward direction in said second optical waveguide arm; and
receiving in combination said first and second light waves propagating in said forward direction from said first and second optical waveguide arms, respectively, at an output optical waveguide section coupled said first and second optical waveguide amps, and for providing approximately an equal portion of a feedback light wave propagating in the backward direction in said output optical waveguide section to each of said first and second optical waveguide arms for backward propagation therein as said first and second light waves.

27. The method of claim 26, wherein said input light wave is provided to said first and second optical waveguide arms through a first optical waveguide Y-branch coupling said input waveguide section to said first and second optical waveguide arms.

28. The method of claim 27, wherein said first optical waveguide Y-branch has a first branch coupled to said input optical waveguide section, and second and third branches coupled to said first and second optical waveguide arms, respectively, said second and third branches having an angular separation in the range of 0.1 to 3 degrees.

29. The method of claim 26, wherein said output optical waveguide section receives said first and second light waves through an optical waveguide Y-branch coupling said output optical waveguide section to said first and second optical waveguide arms.

30. The method of claim 29, wherein said optical waveguide Y-branch has a first branch coupled to said output optical waveguide section, and second and third branches coupled to said first and second optical waveguide arms, respectively, said second and third branches having an angular separation in the range of 0.1 to 3 degrees.

31. The method of claim 26, wherein said material providing said transverse magneto-optical non-reciprocal phase shift comprises bismuth-, lutetium-neodymium- iron garnet.

32. The method of claim 26, wherein said material providing said transverse magneto-optical non-reciprocal phase shift comprises bismuth- lutetium- iron garnet.

33. The method of claim 26, wherein said material providing said transverse magneto-optical non-reciprocal phase shift comprises yttrium iron garnet.

34. The method of claim 26, wherein said material providing said transverse magneto-optical non-reciprocal phase shift comprises rare-earth substituted yttrium-iron garnet.

35. The method of claim 26, wherein said material providing said transverse magneto-optical non-reciprocal phase shift comprises rare-earth substituted iron garnet.

36. The method of claim 31, wherein said material providing said transverse magneto-optical non-reciprocal phase shift has a thickness ranging from 0.3 μm to 1.0 μm.

37. The method of claim 31, wherein said input optional waveguide section, first and second optical waveguide arms and said output optical waveguide section each has a width ranging from 0.5 μm to 6.0 μm.

38. The method of claim 31, wherein said input optical waveguide section, first and second optical waveguide arms and said output optical waveguide section each has a waveguide height of 0.5 μm.

39. The method of claim 31, wherein said input optical waveguide section, first and second optical waveguide arms and said output optical waveguide section are rib waveguides having a rib height of 0.07 μm.

40. The method of claim 26, wherein said input optical waveguide section has a length of 3.9 mm.

41. The method of claim 26, wherein said output optical waveguide section has a length of 3.9 mm.

42. The method of claim 27, wherein said first optical waveguide Y-branch has a length of 0.4 mm.

43. The method of claim 29, wherein said optical waveguide Y-branch has a length of 0.4 mm.

44. The method of claim 26, wherein said first optical waveguide arm is spaced from said second optical waveguide arm by 24.4 μm.

45. The method of claim 31, wherein said first and second transverse magnetic fields are respectively applied by first and second magnets spaced from one another by 6 mm.

46. The method of claim 31, wherein said first and second light waves each have a wavelength in vacuum of 1.55 μm and said first optical waveguide arm is 0.2 μm longer than said second optical waveguide arm.

47. The method of claim 26, wherein said first optical waveguide arm is approximately a quarter wavelength of said first and second light waves propagating in said first and second optical waveguide arms shorter than said second optical waveguide arm.

48. The method of claim 31 further comprising said input optical waveguide section, said first and second optical waveguide arms and said output optical waveguide section are each rib waveguides having a width of 2.0 $\mu$m, a height of 0.5 $\mu$m and a rib height of 0.07 $\mu$m, wherein effective optical isolation is provided for wavelengths in the range 1.4 $\mu$m to 1.7 $\mu$m.

* * * * *